May 2, 1967 J. D. USRY 3,317,184
PINTLE VALVE AND FLOW COLLIMATOR
Filed April 15, 1964
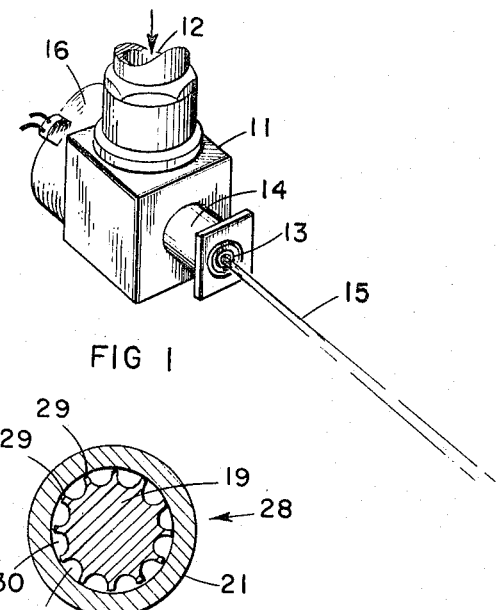
FIG 1
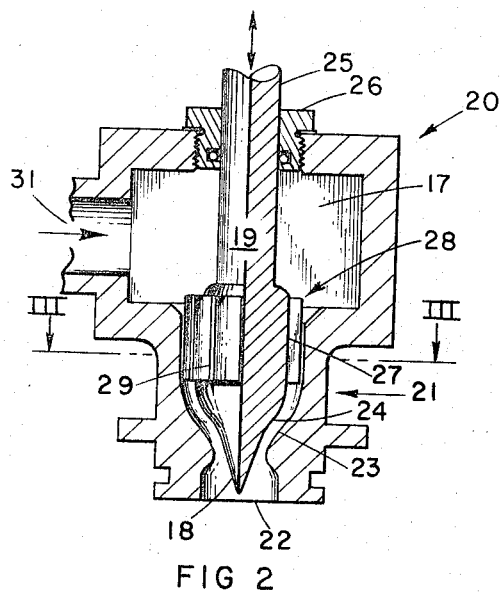
FIG 2
FIG 3
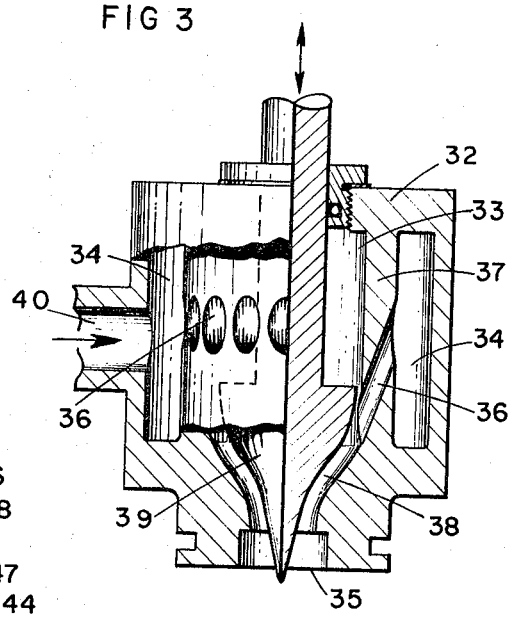
FIG 4
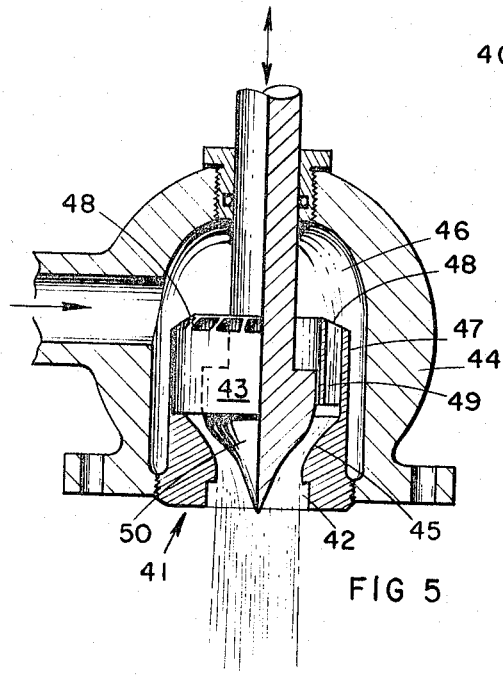
FIG 5
JOE D. USRY
INVENTOR.
BY *Glenn H. Antrim*
AGENT United States Patent Office 3,317,184
Patented May 2, 1967

3,317,184
PINTLE VALVE AND FLOW COLLIMATOR
Joe D. Usry, Arlington, Tex., assignor to Ling-Temco-Vought, Inc., Dallas, Tex., a corporation of Delaware
Filed Apr. 15, 1964, Ser. No. 359,922
6 Claims. (Cl. 251—122)

This invention pertains to valves for ejecting a free flowing, uniform stream of fluid and particularly to a pintle control valve with a collimator for ejecting a jet stream in a direction at right angles to an incoming flow.

The direction of the thrust of a jet engine is normally in line with the axis of the exhaust duct of the engine. For guidance control, a plurality of thrust control valves are installed on a circumference of the exhaust duct. As a selected one of the valves or a group of adjacent valves is operated, a collimated, uniform stream of fluid is ejected inwardly in a transverse direction relative to the main exhaust stream. The transverse flow establishes a shock wave that diverts the direction of the exhaust flow from its normal axial direction and, thereby changes the direction of thrust of the engine.

A collimated flow of liquid from a high-pressure supply is readily attained by a jet pipe that has a high ratio of its length to its inside diameter, the length being straight in the direction of the ejected jet stream and the diameter being uniform. Obviously, the positioning of a long jet pipe transverse the direction of the axial thrust in a jet engine is impractical because supply pipes and the valves must be maintained close to the outer wall of the exhaust duct. Therefore, the direction of an ejected stream must be at a right angle to the direction of the incoming flow, and the quantity of the injected flow must be controlled in accordance with a required rate of change of direction of thrust.

Accordingly, this invention comprises a valve chamber having an inlet with its axis perpendicular to the axis of an output orifice, a pintle movable relative to a seat located at the orifice, and a flow collimator disposed about said pintle to direct flow through the orifice.

An object of the present invention is to improve a pintle-type ejector for maintaining a uniform jet stream of liquid that has little divergence.

Other objects and advantages will be apparent from the specification and claims and from the accompanying drawing illustrative of the invention in which:

FIG. 1 is a perspective oblique view of a jet valve;
FIG. 2 shows a vertical central section of a valve having a flow collimator attached to its pintle;
FIG. 3 is a cross-sectional view taken on line III—III of FIG. 2 to show passageways of the flow collimator;
FIG. 4 is a sectional view of a valve that has a flow collimator with slanted bores as passageways between concentric cylinders; and
FIG. 5 is a cross-sectional view of a valve in which a collimator has parallel passageways mounted to an exhaust seat.

A general arrangement and function of a valve, that is suitable for controlling the direction of thrust of a jet engine, is illustrated in FIG. 1. A valve housing or plenum 11 has on one of its sides an inlet 12 for receiving liquid under high pressure from a supply line that is conveniently spaced from the outer surface of an exhaust duct of a jet engine. A cylindrical pintle valve housing 14 with its discharge orifice 13 is located on an adjoining side to discharge a jet stream 15 in a direction perpendicular to the direction of flow into the inlet 12. An actuator mounted within its housing 16 moves a pintle valve axially within its housing.

When the valve is controlled for supplying fluid at a low rate to the jet stream 15, a small plenum 17, as illustrated in FIG. 2, is quite effective to prevent rotational vectors that cause dispersion of an ejected stream. To maintain a straight uniform stream at the low rates of flow, a tapered point 18 is provided on the outer end of a controlling pintle 19. At higher rates of flow, the point 18 is ineffective and a flow collimator associated with the pintle 19 dominates in controlling the stream 15. Each of the collimators shown in FIGS. 2, 4, and 5, as described in detail below, provide a plurality of passageways evenly distributed about a pintle. Each passageway, although relatively short, has a diameter small enough to provide a sufficiently high ratio of length to diameter to confine flow in only the direction of the axis of the associated orifice.

In FIG. 2, a housing 20 has a portion that contains a plenum 17 and a smaller adjoining cylindrical collimating and metering portion 21. The outer end of the metering portion 21 has an annular orifice 22 with an unrestricted passage outwardly. The surface 23 of the orifice that faces the interior of the plenum or chamber 17 diverges gradually until it joins the cylindrical walls of the metering portion 21. The diverging surface encircling the orifice 21 forms a seat that is engaged by the surface of the conical portion 24 of the pintle 19 when the valve is shut.

The shaft 25 of the pintle 19 is slidably mounted by a bearing and seal assembly 26 that is disposed in the wall of housing 20 so that the pintle is mounted coaxially relative to its seat. The pintle 19 has a solid cylindrical portion 27 with a diameter substantially less than that of the cylindrical cavity of the metering portion 21. A flow collimator 28 is formed by longitudinal vanes 29 that are spaced circumferentially about the cylindrical portion 27 of the pintle. The vanes extend radially until they form a free sliding fit within the cylinder of the metering portion 21. As shown in FIG. 3, the vanes form a plurality of parallel passageways 30 between the cylindrical body 27 of the pintle 19 and the inside surface of the cylindrical walls of the metering portion 21. An inlet 31 in an adjoining side of the housing 20 supplies fluid to the plenum 17.

In the embodiment according to FIG. 4, a housing 32 has an inner cylindrical metering chamber 33 and a flow distribution chamber 34 that encompasses the metering chamber 33. The wall at one end of the metering chamber 33 converges gradually to an orifice 35. A plurality of straight passageways 36 extend slantingly downwardly from the flow distribution chamber 34 through the common wall 37 to the lower portion of the metering chamber 33 so as to provide a substantially straight direction of flow of liquid from the distribution chamber 34, past the metering area 38 and out the orifice 35. The passageways 36 are evenly distributed circumferentially and have sufficient total flow capacity to provide required maximum flow of liquid from orifice 35. The pintle 39 is substantially conical with its base portion being a sliding fit within the inner metering chamber 33. The base portion extends into the metering chamber 33 sufficiently to block flow that would cause within the chamber 33 circulation that would interfere with collimation and cause energy losses of the jet stream. The pintle is mounted for axial movement as described for FIG. 2. As described above, an inlet 40 is at a right angle to the orifice 35, and supplies liquid under pressure to the flow distribution chamber 34.

In FIG. 5, a discharge part 41 has an unrestricted annular orifice 42 and a collimator 43. The part 41 is secured in a wall of the housing 44 such that the collimator 43 is upstream from the orifice 42. The orifice 42 has a conical surface 45 that gradually diverges to form a metering seat facing inwardly into the plenum 46. The collimator 43 has an outer cylindrical wall 47 that is coaxial with the axis of the orifice 42 and that is a continuation of the upper portion of the diverging metering seat. From this outer wall 47, longitudinal vanes or partitions 48 extend radially to a coaxial inner wall 49. The partition 48 are evenly spaced circumferentially to form a plurality of passageways between the walls 47 and 49 each having a much longer dimension in the direction of fluid flow than in any transverse direction. A pintle 50 is substantially conical shaped with an elongated apex that extends outwardly through the orifice 42. The base of the cone is a sliding fit within the inner wall 49 of the collimator 43. The pintle is coaxially mounted and movable axially to vary the metering area between the surface 45 and the surface of the pintle 50.

The general conical shape of the metering portion of a pintle can be modified according to control characteristics desired. A preferred shape provides linear control; that is, the quantity of flow of liquid from the orifice varies in equal increments for equal changes in distance of travel of the pintle in its axial direction. When a collimated stream in an axial direction is not required for a low rate of fluid flow, the apex of the pintle need not be elongated to provide a pointed guide. Typically, a well designed pintle valve or injector without a collimator ejects a jet stream that spreads according to a cone having an included angle that is determined by the ratio of turbulent velocity, normal to the stream axis, to the axial stream velocity. A typical included angle without a collimator is 15 degrees or more. The angle can readily be reduced to less than 10 degrees by the addition of vanes to the pintle as shown in FIG. 2. According to a preferred embodiment of FIG. 5, the angle may be only 4 degrees.

While various modifications of the invention have been described in detail herein and shown in the accompanying drawing, it will be evident that various further modifications are possible in the arrangement and construction of its components without departing from the scope of the invention.

I claim:

1. A pintle valve for a mounting space that is limited in the direction of a desired ejected uniform stream of fluid comprising: a valve chamber having a plenum, an inlet to the plenum for receiving fluid under pressure, and a discharge orifice, a valve seat encircling said discharge orifice, said seat facing the interior of said chamber, a pintle having a substantially conical metering portion, said pintle being disposed so that said pintle and said seat are coaxial, the apex of said conical metering portion being directed outwardly along the axis of said orifice, means for mounting said pintle and said seat to said valve chamber to provide change in spacing between said metering portion of said pintle and said seat;

a cylindrical collimator having a plurality of passageways with a ratio of length to diameter such that flow is confined to the direction of the axis of said orifice, said collimator closely encompassing said pintle, said collimator having cylindrical walls coaxial with said pintle and said orifice to prevent flow of fluid within said plenum to said orifice except through said collimator.

2. The combination of a pintle valve and a flow collimator comprising: a valve chamber having an inlet for receiving fluid under pressure, and a discharge orifice, said inlet and said orifice being positioned in the walls of said chamber so as to require a change in direction of flow of fluid between said inlet and said orifice, a seat for said pintle encircling said discharge orifice and facing the interior of said chamber, a pintle having a substantially conical end portion, said pintle being mounted within said chamber so that said pintle and said orifice are coaxial, said pintle being movable axially relative to said seat to vary the metering space between the conical surface of said pintle and said seat;

a cylindrical flow collimator encircling said conical end portion of said pintle to prevent flow of fluid to said orifice except through said collimator, said flow collimator having a plurality of circumferentially evenly spaced passageways parallel with the axis of said pintle and having a ratio of length to diameter to confine flow in only the direction of the axis of said orifice to form a collimated uniform jet stream for any position of said pintle that allows substantial flow of the fluid.

3. In combination, a pintle valve and a flow collimator comprising: a pintle, a metering outlet chamber, and an input flow distribution chamber to which liquid is supplied at high pressure, said metering outlet chamber being substantially a cylindrical chamber with a coaxial metering outlet in one end thereof, the inwardly facing surface of said one end diverging from said outlet to the adjacent cylindrical wall of said metering output chamber to form a metering seat to be engaged by said pintle, said pintle being substantially conical-shaped, said pintle being coaxially mounted within said outlet chamber and movable axially for varying metering space between the surface of said cone and said seat, said flow distribution chamber surrounding said outlet chamber, a plurality of straight passageways communicating between said flow distribution chamber and said outlet chamber, the direction of flow through said passageways being in line with said inwardly facing surfaces of said seat to form a collimated flow of liquid from said input flow distribution chamber through said metering outlet, thereby to provide an output jet stream that is collimated for different positions of said pintle relative to its seat, and the base dimension of said conical portion of said pintle being sufficient to guide substantially all of the flow of liquid from said passageways directly through said metering space.

4. A pintle valve assembly comprising: a chamber, said chamber having an inlet for receiving pressurized fluid, and a discharge orifice, said orifice having a seat with a face that is diverging toward the interior of said chamber, said chamber having a cylindrical portion with its inner wall joining said diverging face of said seat, a pintle with a cylindrical body and a substantially conical metering end portion, said pintle being mounted coaxially in said seat so that said metering portion engages said seat, said cylindrical portion of said pintle having a diameter substantially less than the diameter of said cylindrical portion of said chamber, a plurality of vanes disposed longitudinally at spaced intervals on the outer surface of the cylindrical portion of said pintle, said vanes extending radially from said pintle to form a plurality of parallel passageways between said body of said pintle and said cylindrical portion of said chamber having a ratio of length to width sufficient to collimate a flow of fluid as it flows from said inlet in the axial direction of said orifice, said pintle being movable longitudinally to vary the area of the opening between said metering surface of said pintle and said seat, said orifice having an unrestricted opening, and said collimator being effective to maintain a uniform ejected stream of fluid for wide variations in the positioning of said pintle.

5. In combination, a pintle valve and a flow collimator, a plenum chamber having an inlet to which is applied fluid at high pressure, said pintle valve providing a discharge orifice from said chamber through which a controlled amount of said fluid flows to form a collimated uniform free stream of fluid, said pintle valve having a seat at said orifice and a pintle coaxially movable relative to said seat, said pintle being substantially conical with its apex being directed outwardly on the axis of said orifice.

said flow collimator having an outer cylindrical wall, an inner cylindrical wall, and a plurality of vanes, said walls being coaxial, said vanes being disposed radially and longitudinally between said walls to provide a plurality of parallel fluid passageways, said pintle being a coaxial sliding fit within said inner wall, said flow collimator being mounted coaxially to the inwardly facing edge of said seat, the edge of said seat that is adjacent said flow collimator being diverging to encompass the adjacent ends of said passageways, and said orifice having an unrestricted outer face to aid in formations of said free stream of fluid without loss of pressure.

6. In a pintle type valve having a plenum chamber with an inlet and a discharge orifice, the direction of flow of liquid applied under pressure to said inlet being at a right angle to the direction of flow of liquid ejected from said orifice, said orifice having an annular seat with a diverging surface facing the interior of said chamber, said pintle having a substantially conical outer surface facing said orifice for mating with said seat, the outer facing apex of said conical surface being elongated outwardly to form a gradually tapered point to aid in the formation of a uniform stream of liquid, said pintle being mounted coaxially within said seat and being movable coaxially to vary the spacing between said conical surface and said seat according to a desired rate of flow of said liquid from said orifice;

a flow collimator comprising inner and outer coaxial cylindrical walls, said walls being spaced apart radially, a plurality of circumferentially spaced axially extending longitudinal fins disposed between said inner and said outer walls to provide a plurality of adjacent parallel flow passageways, the base portion of said conical surface of said pintle being a sliding fit within said inner wall, said flow collimator being mounted coaxially within said seat such that said pintle is axially movable within said inner wall, the inwardly facing portion of said seat being gradually tapered outwardly to increase its circumference until it encompasses said passageways of said collimator to allow a collimated flow of said liquid from said chamber to said seat, said orifice providing unrestricted jet flow to prevent loss of pressure as a free flowing substantially collimated flow of said liquid is ejected for any substantial amount of flow as determined by the positioning of said pintle.

References Cited by the Examiner

UNITED STATES PATENTS

| | | | |
|---|---|---|---|
| 2,301,355 | 11/1942 | Armentrout | 138—45 |
| 2,353,143 | 7/1944 | Bryant | 251—118 X |
| 2,402,729 | 6/1946 | Buchnan | 138—46 X |
| 2,439,118 | 4/1948 | Waterman | 251—118 X |
| 2,642,254 | 6/1953 | Armstrong | 251—118 X |
| 2,649,273 | 8/1953 | Honegger | 251—122 X |
| 3,139,114 | 6/1964 | Benzel | 138—45 |

FOREIGN PATENTS 29,704    1912    Great Britain.

M. CARY NELSON, *Primary Examiner.*

S. SCOTT, *Assistant Examiner.*